(12) United States Patent
Sakamoto

(10) Patent No.: US 7,731,269 B2
(45) Date of Patent: Jun. 8, 2010

(54) DOOR LINING FOR A VEHICLE DOOR

(75) Inventor: Takaki Sakamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/077,763

(22) Filed: Mar. 21, 2008

(65) Prior Publication Data
US 2009/0066107 A1 Mar. 12, 2009

(30) Foreign Application Priority Data
Sep. 10, 2007 (JP) ............................. 2007-233976

(51) Int. Cl.
*B60J 5/04* (2006.01)
(52) U.S. Cl. .................................... 296/153; 296/146.7
(58) Field of Classification Search ................. 296/153, 296/146.7; 200/52 R
See application file for complete search history.

(56) References Cited

U.S. PATENT DOCUMENTS

| | | | | |
|---|---|---|---|---|
| 5,448,028 A | * | 9/1995 | Filion et al. ............... | 200/52 R |
| 7,121,611 B2 | * | 10/2006 | Hirotani et al. .......... | 296/146.7 |
| 7,198,319 B2 | | 4/2007 | Schroder et al. | |
| 2001/0017476 A1 | * | 8/2001 | Nishikawa et al. ....... | 296/146.6 |
| 2008/0023983 A1 | * | 1/2008 | Reed et al. ............... | 296/146.7 |

FOREIGN PATENT DOCUMENTS

| | | |
|---|---|---|
| CN | 1723140 (A) | 1/2006 |
| JP | 1-134162 | 9/1989 |
| JP | 02-124029 | 5/1990 |
| JP | 04-79752 | 7/1992 |
| JP | 7-172176 | 7/1995 |
| JP | 2002-172982 | 6/2002 |
| WO | WO 2004/108481 A1 | 12/2004 |

* cited by examiner

*Primary Examiner*—Joseph D Pape
(74) *Attorney, Agent, or Firm*—Carrier, Blackman & Associates, P.C.; William D. Blackman; Joseph P. Carrier

(57) ABSTRACT

An armrest formed in a door lining of an automotive door lining includes an upper wall fitted with a power window switch, a lower wall provided with an opening permitting access to a lower part of the switch and a detachable lid fitted on the opening. Thus, the opening in the lower wall of the armrest enables a worker to connect a wire harness drawn out of the interior of the door to the lower part of the power window switch. Because the opening is formed in the lower wall of the armrest which is usually concealed from the vehicle occupant, it does not produce an aesthetically negative impact. If desired, the opening may also be formed in other parts of the armrest as long as the opening is favorably concealed or otherwise prevented from impairing the external appearance of the door lining.

17 Claims, 3 Drawing Sheets

US 7,731,269 B2

DOOR LINING FOR A VEHICLE DOOR

TECHNICAL FIELD

The present invention relates to a door lining for a vehicle door that can simplify the work required for assembling a vehicle door.

BACKGROUND OF THE INVENTION

A door lining (or door trim) of an automotive door is typically provided with an integral armrest that protrudes toward the passenger compartment. An armrest is typically fitted with an electric component such as a power window switch, a door mirror adjustment switch and switches for other onboard equipment. Typically, only a part of the electric component protrudes from the upper wall of the armrest, and the remaining part thereof is placed inside the hollow interior of the armrest. Therefore, when assembling such a component, it is necessary to mount it from the interior of the armrest or from the side of the door lining facing the interior of the door, and this tends to complicate the assembly process.

According to a proposal disclosed in Japanese patent laid open publication No. 2002-172982, a component is mounted on an upper wall of a door armrest by using resilient engagement tabs provided with a barb that permit the component to be mounted and secured in position from above or from the exterior of the door handle. However, according to this proposal, the external appearance of the armrest is not so attractive as desired, and there is some difficulty in servicing the component once it is mounted because of the difficulty in removing the component without damaging the surrounding part of the armrest.

Also, the space above the armrest may be limited typically owing to the presence of a door handle extending in the space above the armrest so that the work required for assembling and removing the component to and from the upper wall of the armrest may not be easy.

BRIEF SUMMARY OF THE INVENTION

In view of such problems of the prior art, a primary object of the present invention is to provide a door lining for a vehicle door which is easy to assemble and attractive in external appearance.

A second object of the present invention is to provide a door lining for a vehicle door which permits easy servicing of a component attached to an upper wall of an armrest provided in the door lining.

A third object of the present invention is to provide a door lining for a vehicle door which simplifies the assembly work without increasing the manufacturing cost.

According to the present invention, these and other objects can be accomplished by providing a door lining attached to an inboard side of an automotive door, comprising: a door lining main body having a substantially planar shape; an armrest bulging inwardly out of the door lining main body and elongated in a fore-and-aft direction, the armrest including an upper wall fitted with an electric component part and a lower wall provided with an opening permitting access to a lower part of the electric component; the door lining further comprising a detachable lid fitted on the opening.

Thus, the opening in the lower wall of the armrest enables a worker to connect a wire harness drawn out of the interior of the door to the lower part of the electric component. Because the opening is formed in the lower wall of the armrest which is usually concealed from the vehicle occupant, it does not produce any aesthetically negative impact. If desired, the opening may also be formed in other parts of the armrest as long as the opening is favorably concealed or otherwise prevented from impairing the external appearance of the door lining.

Typically, the electric component consists of a switch for a power window which is attached to an inner surface of the upper wall.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
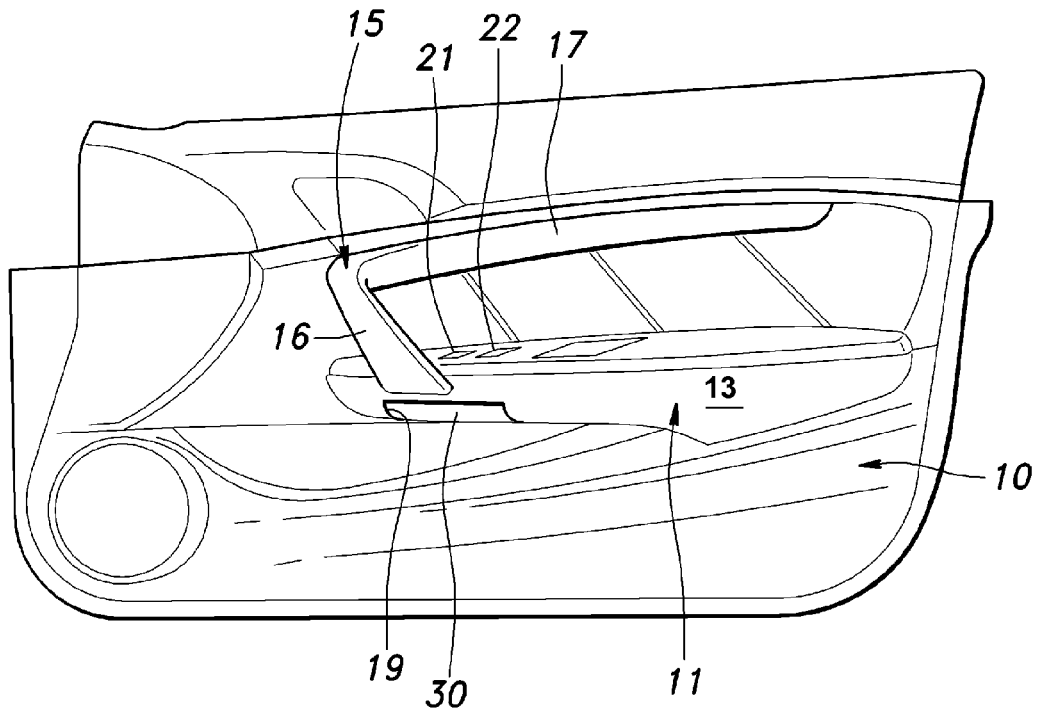
FIG. 1 is a front view of the door lining embodying the present invention as seen from the passenger compartment.
Figure 2:
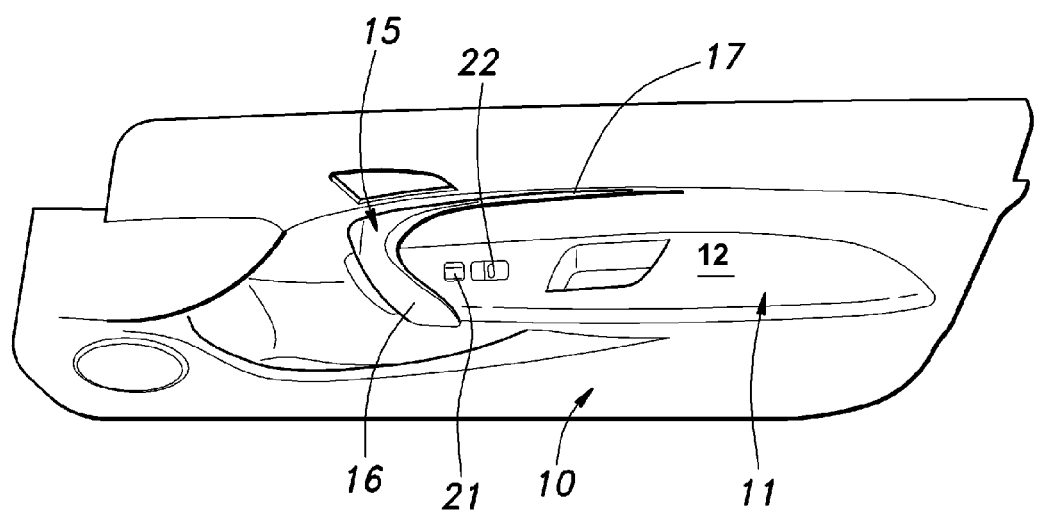
FIG. 2 is a view similar to FIG. 1 as seen from a higher point in the passenger compartment.

FIGS. 1 and 2 shows the inboard side of an automotive door which is covered by a door lining embodying the present invention. The door lining is typically attached to an inner door panel of the door, and includes a door lining main body 10 and an armrest 11 that bulges or protrudes from the door lining main body 10 into the passenger compartment. The armrest 11 consists of a hollow member made of relatively rigid molded plastic material and relatively elongated in a fore-and-aft direction, and comprises an upper wall 12, a side wall 13 and a lower wall 14. In the illustrated embodiment, the side wall 13 and lower wall 14 are integrally molded with the door lining main body 10 while the upper wall 12 is separately molded and permanently attached to the remaining part of the armrest 11.

An inner door handle 15 is attached to the inboard side of the door lining. The door handle 15 includes a relatively vertical rod-shaped main body 16 extending above the upper wall 12 of the armrest 11, an upper part 17 extending rearward from the upper end of the door handle main body 16 and attached to the door lining (above the armrest 11) over a substantial length of a rear end thereof and a lower end attached to the side wall 13 of the armrest 11. The door handle upper part 17 is provided for an ornamental purpose while the door handle main body 16 allows a vehicle passenger to hold thereonto when opening and closing the door. In particular, a significant clearance is created above the armrest 11 between the door handle main body 16 and the door lining main body so that a vehicle occupant may be able to hold the door handle without being hindered by any part of the upholstery.

Figure 4:
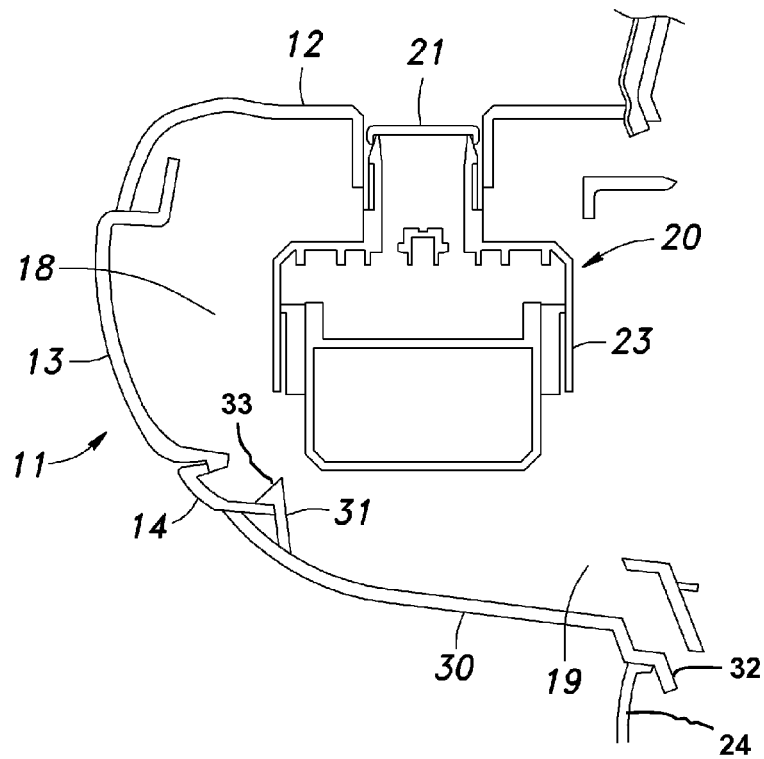
FIG. 4 is a cross sectional view of the armrest.
Figure 5:
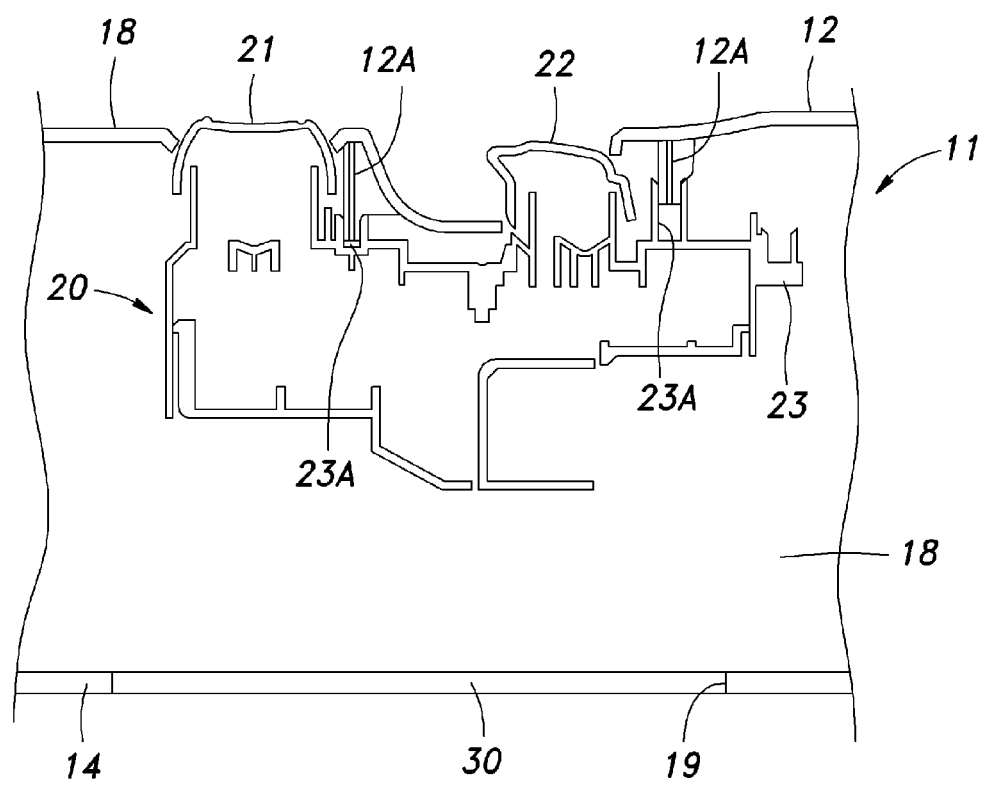
FIG. 5 is a vertical sectional view taken along a vertical plane extending in the fore-and-aft direction of the vehicle.

The upper wall 12 of the armrest 11 is fitted with a power window switch 20 including switch keys 21 and 22 protruding from the upper surface of the upper wall 12. As shown in FIGS. 4 and 5, the switch 20 includes a main body 23 received within the hollow interior 18 of the armrest 11, and is secured in position owing to the engagement between engagement tabs 12A extending downwardly from the upper wall 12 and corresponding engagement recesses 23A formed in the switch main body 23. Typically, the door switch 20 is attached to the upper wall 12 before the door lining is attached to the vehicle door.

The lower wall 14 of the armrest 11 is provided with a rectangular opening 19 in such a position as to permit access to the switch main body 23 from this opening 19. In particular, this opening 19 permits a worker to connect an end of a wire harness, (not shown in the drawings) drawn out of the interior of the door, to the switch main body 23 during the vehicle assembly process. It will be understood that this operation will require an assembly worker to insert all or part of the worker's hand through the opening 19 in order to reach the switch main body. Accordingly, the opening 19 should be made sufficiently large to allow a user's hand to fit therethrough.

Figure 3:
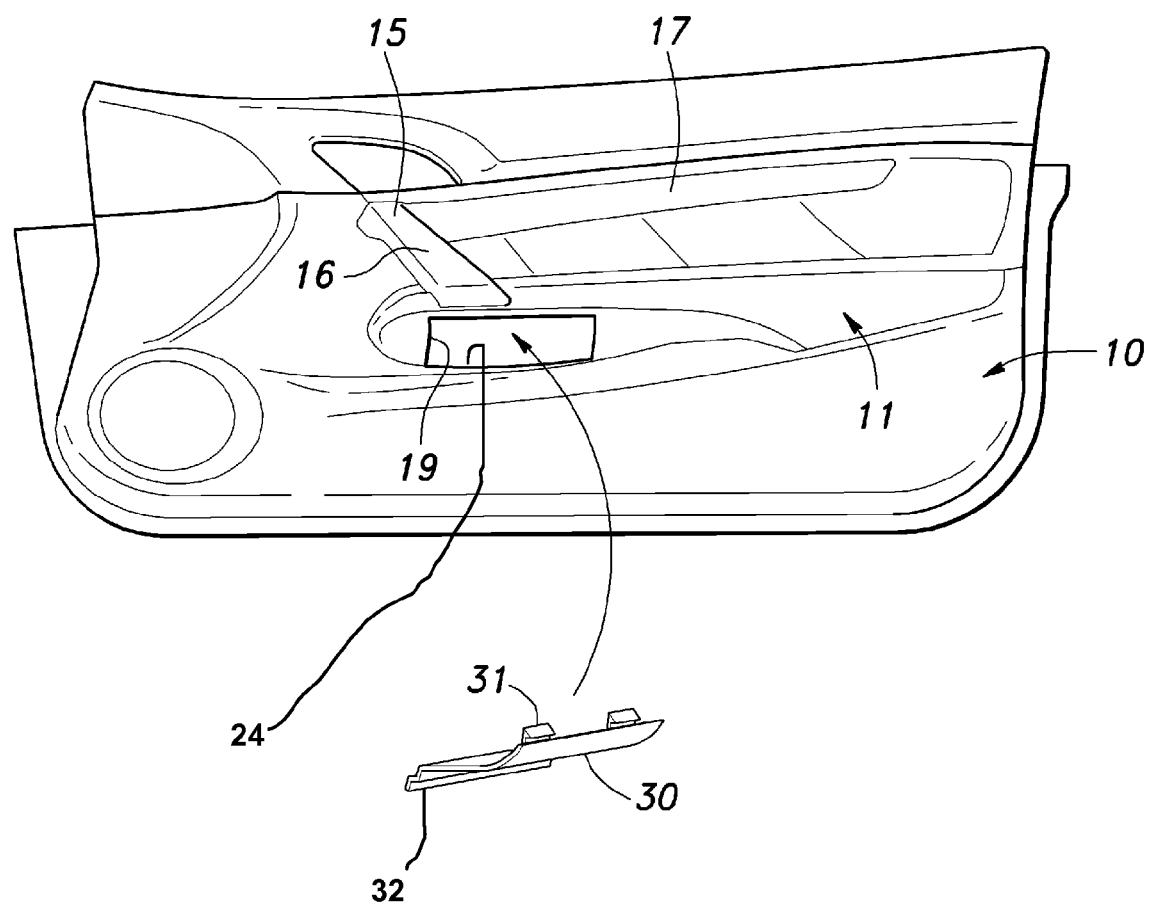
FIG. 3 is a view similar to FIG. 1 as seen from a lower point in the passenger compartment.

This opening 19 is normally closed by a lid 30 after the wire harness is connected to the switch main body 23. As shown in FIG. 3, the lid 30 includes an inwardly bent or offset lower edge 32 configured to engage a linear outboard edge 24 of the lower wall 14 proximate the opening 19. The lid 30 also includes a pair of engagement pieces 31 (which are each provided with a barb 33) obliquely protruding from the inner side of an upper part of the lid 30 and configured to resiliently engage a linear inboard edge of the opening 19. The lid 30 is detachably fitted on the opening 19 with a substantially horizontal orientation.

The process of assembling the door lining to the vehicle door is now described in the following.

First of all, the switch 20 is secured in position from the interior 18 of the armrest 11 by engaging the engagement tabs 12A with the engagement recesses 23A so that the switch key 21 and 22 may protrude out of the openings in the upper wall 12 of the armrest 11. Typically, a snap fit arrangement not shown in the drawings is used, but other suitable fasteners may also be used. The door lining is then attached to the inner panel of the door by using any known arrangement. Then, an end of a wire harness not shown in the drawings is drawn out of the interior of the door by a worker inserting his hand into the interior of the door panel through the opening 19. Therefore, the opening 19 has to be sized to allow the human worker access to the interior portion of the door armrest 11. Once the end of the wire harness is suitably connected to the switch main body 23, the opening 19 is closed by the lid 30.

Thus, the opening 19 in the lower wall of the armrest 11 enables the worker to connect the wire harness to the switch main body 23. Because the opening 19 is formed in the lower wall 14 of the armrest 11 which is usually concealed from the vehicle occupant, it does not produce an aesthetically negative impact. If desired, the opening 19 may also be formed in the side wall 13 as long as the opening is favorably concealed or otherwise prevented from impairing the external appearance of the door lining.

This opening 19 permits access to the switch main body 23 not only at the time of assembly but also for repair and maintenance purposes.

Although the present invention has been described in terms of a preferred embodiment thereof, it is obvious to a person skilled in the art that various alterations and modifications are possible without departing from the scope of the present invention which is set forth in the appended claims. For instance, the electric component that can be fitted to the armrest is not limited to a power window switch but may also include a door mirror adjustment switch, a door lock control switch and other switches and indicators.

The contents of the original Japanese patent application on which the Paris Convention priority claim is made for the present application are incorporated in this application by reference.

The invention claimed is:

1. A door lining attached to an inboard side of an automotive door, said door lining comprising:
   a door lining main body having a substantially planar shape; and
   an armrest bulging inwardly out of the door lining main body and elongated in a fore-and-aft direction, the armrest including:
      an upper wall;
      an electric component part fitted to the upper wall;
      a second wall disposed below the upper wall and provided with an opening formed therein, wherein the opening is sufficiently large to allow a user's hand to fit therethrough for permitting access to a lower part of the electric component, whereby the user is able to access the electric component by hand with the armrest in an installed configuration thereof;
      and a detachable lid fitted on the opening with a substantially horizontal orientation, wherein the lid is formed separately from the second wall of the armrest so as to be completely removable therefrom, in order to provide substantially unobstructed access to the electric component part via the opening when the lid is removed.

2. The door lining according to claim 1, wherein the electric component is attached to an inner surface of the upper wall.

3. The door lining according to claim 1, wherein the electric component comprises a switch for a power window.

4. The door lining according to claim 1, wherein the opening is situated so as to be substantially concealed from a perspective of a vehicle occupant seated proximate the door lining when the door lining is installed in a vehicle.

5. The door lining according to claim 1, wherein the lid comprises a lower portion forming a downwardly extending flange configured to fit behind a first edge portion of the second wall proximate the opening, and an upper portion having at least one engagement piece extending outwardly thereon at an inner side thereof, the engagement piece provided to resiliently engage a second edge portion of the second wall proximate the opening.

6. The door lining according to claim 5, wherein the upper wall has a hole formed therein, and wherein said electric component is secured from an interior area of the armrest so as to partially protrude out of the hole formed in the upper wall.

7. The door lining according to claim 1, wherein the second wall is and a lower wall.

8. The door liner of claim 7, wherein the second wall is integrally molded with the door lining main body, and the upper wall is separately molded and attached to the second wall and to the door lining main body.

9. A door lining attached to an interior side of a vehicle door, said door lining comprising:
   an inner door handle,
   a door lining main body,
   an armrest having a hollow space formed therein and protruding outwardly from the door lining main body, the armrest extending substantially in a fore and aft direction, the armrest having an upper wall and a second wall disposed below the upper wall and having an opening formed therein which is sufficiently large to allow a user's hand to fit therethrough, whereby the user is able to access the electronic component by hand with the armrest in an installed configuration thereof, an electronic component fitted inside of the armrest, and a detachable cover for placement over the opening in a substantially horizontal orientation, wherein the inner door handle is operatively attached to the door lining main body, the inner door handle comprising:

a door handle main body having a lower end attached to the armrest, a grasping portion extending from the lower end to an area above an upper wall of the armrest, and an upper handle part extending from an upper end of the grasping portion and attached to the door lining main body.

10. The door liner of claim 9, wherein the second wall comprises a lower wall integrally molded with the door lining main body, and wherein the upper wall is separately molded and attached to the second wall and to the door lining main body.

11. The door lining according to claim 9, wherein the lid comprises a lower portion configured to fit behind a first edge portion of the lower wall proximate the opening, and an upper portion having at least one engagement piece extending outwardly thereon at an inner side thereof, the engagement piece provided to resiliently engage a second edge portion of the lower wall proximate the opening.

12. The door lining according to claim 9, wherein the opening is situated so as to be substantially concealed from a perspective of a vehicle occupant seated proximate the door lining when the door lining is installed in a vehicle.

13. The door lining according to claim 9, wherein the electric component is attached to an inner surface of the upper wall.

14. The door lining according to claim 9, wherein the electric component comprises a switch for a power window.

15. The door lining according to claim 9, wherein the second wall is a lower wall.

16. The door lining according to claim 1, further comprising a door handle extending from a surface of the door lining to a part of the armrest above the upper wall of the armrest fitted with the electric component part.

17. The door lining according to claim 1, wherein the electric component is attached to an inner surface of the upper wall, and wherein the opening is formed in a part of a lower wall of the armrest situated directly below the electronic component part, so as to provide access to the electric component part.

* * * * *